May 28, 1968  A. W. JACOBS  3,385,525
LAWN SPRINKLER
Filed March 16, 1967  2 Sheets-Sheet 1
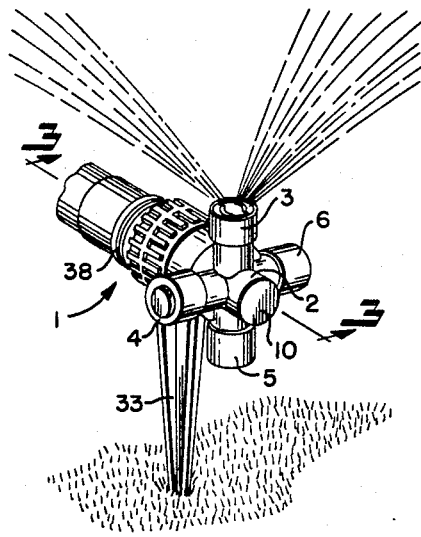
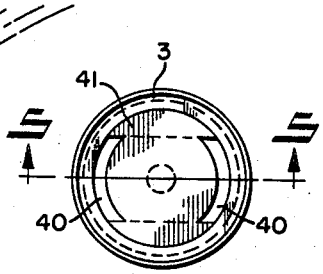
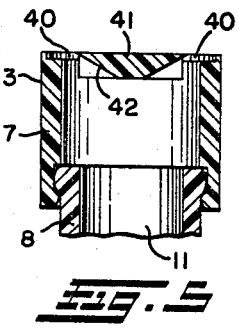
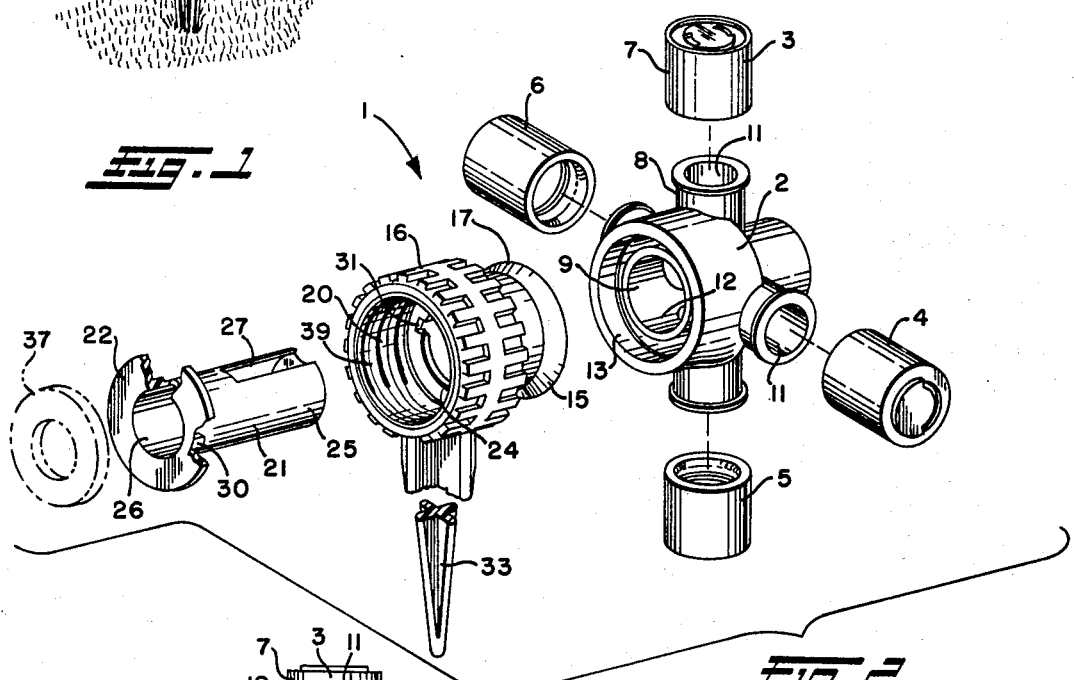
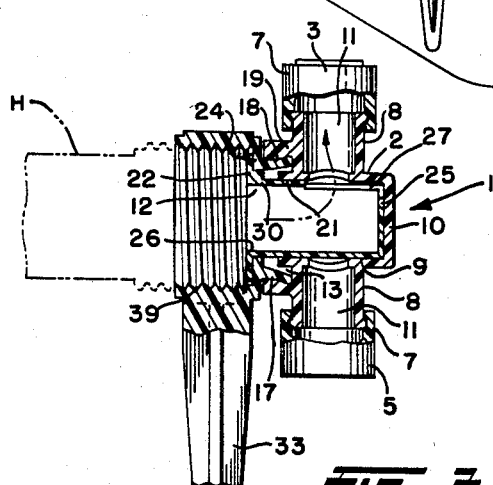
INVENTOR.
ARTHUR W. JACOBS
BY
Oberlin, Maky, Donnelly & Renner
ATTORNEYS May 28, 1968  A. W. JACOBS  3,385,525
LAWN SPRINKLER Filed March 16, 1967  2 Sheets-Sheet 2

INVENTOR.
ARTHUR W. JACOBS
BY
Oberlin, Maky, Donnelly & Renner
ATTORNEYS 3,385,525
LAWN SPRINKLER
Arthur W. Jacobs, 5994 Columbia Road,
North Olmsted, Ohio 44070
Filed Mar. 16, 1967, Ser. No. 623,729
5 Claims. (Cl. 239—394)

ABSTRACT OF THE DISCLOSURE

A lawn sprinkler having a sprinkler head which is rotatably mounted for selectively bringing one of a plurality of spray nozzles carried thereby into fluid communication with a water inlet to provide a variety of different spray configurations.

*Disclosure*

The present invention relates generally, as indicated, to a lawn sprinkler, and more particularly to a lawn sprinkler which may be readily adjusted to provide a variety of different spray patterns to suit different lawn configurations or similar areas to be watered.

The most common types of lawn sprinklers now in use have a sprinkler head with a plurality of water outlets therein which collectively provide a single spray pattern, usually in the form of a circle or rectangle, during rotation or oscillation of the sprinkler head. This means, of course, that those areas of the lawn which are outside the general spray pattern of the sprinkler are either neglected or if the sprinkler is later moved to include all areas, there is generally a considerable amount of spraying completely outside the area and overspraying of certain portions within the area.

There are at present several types of lawn sprinklers which are capable of watering different lawn shapes, but in general they have not been too well received commercially, principally due to their high cost and complexity as compared with the single spray pattern lawn sprinklers.

With the foregoing in mind, it is a primary object of this invention to provide a lawn sprinkler which is adapted to provide a variety of different spray configurations and yet is very simple in construction and relatively inexpensive to manufacture.

Another object is to provide such a lawn sprinkler in which it is necessary only to rotate the sprinkler head for communicating any one of a plurality of different spray nozzles mounted thereon with the water inlet.

A further object is to provide such a lawn sprinkler with a minimum number of parts, all preferably made of a suitable plastic material such as nylon and adapted to be press-fitted together for ease of assembly, such parts being provided with complementary tapered surfaces which seal against water leakage.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

In such annexed drawing:

FIG. 1 is an isometric view of a preferred form of lawn sprinkler constructed in accordance with this invention shown connected to a conventional garden hose;

FIG. 2 is an exploded isometric view showing the lawn sprinkler of FIG. 1 in disassembled form;

FIG. 3 is a longitudinal section through the sprinkler of FIG. 1 taken on the plane of the line 3—3 thereof;

FIG. 4 is a top plan view of one of the nozzles which form a part of such lawn sprinkler;

FIG. 5 is a vertical section through the nozzle of FIG. 4 taken on the plane of the line 5—5;

Figure 6:
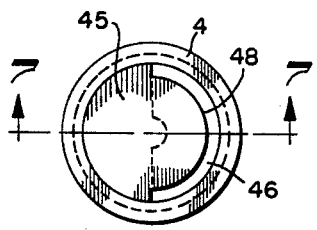
FIG. 6 is a top plan view of another of the nozzles which form a part of the lawn sprinkler.
Figure 8:
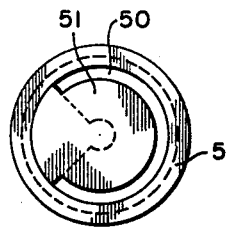
FIGS. 8 and 9 are top plan views of the other two nozzles included in the lawn sprinkler, FIG. 1.
Figure 7:
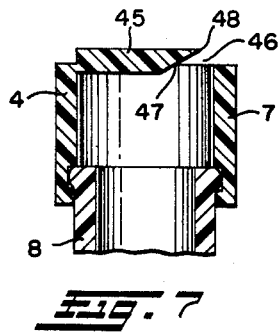
FIG. 7 is a vertical section through the nozzle of FIG. 6 taken on the plane of the line 7—7.
Figure 9:
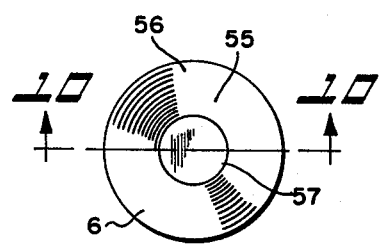
Figure 10:
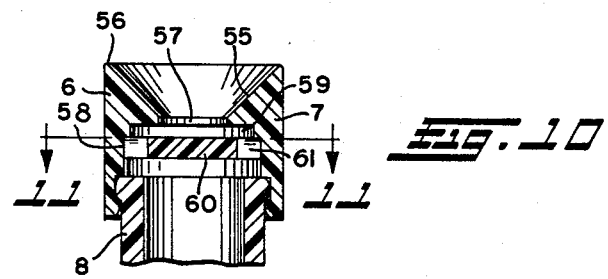
FIG. 10 is a vertical section taken on the plane of the line 10—10, FIG. 9.
Figure 12:
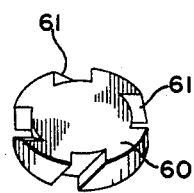
FIG. 12 is an isometric view of such baffle plate, shown removed from its associated nozzle.
Figure 11:
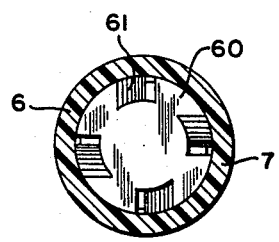
FIG. 11 is a horizontal section through the nozzle of FIG. 10 looking down on the baffle plate contained therein.

Turning now to the details of the drawing and first especially to FIGS. 1–3, a preferred form of lawn sprinkler in accordance with this invention is generally indicated at 1 and comprises a sprinkler head 2 on which there are mounted several spray nozzles 3–6. Although the number and spacing of such nozzles 3–6 may obviously be varied as desired, four of such nozzles are shown, spaced 90° apart. The nozzles 3–6 are preferably in the form of caps 7 with different orifice configurations therein, molded of nylon or like plastic and adapted to be assembled as by means of a snap fit on cylindrical projections 8 extending in a radial direction from the sprinkler head 2.

The sprinkler head 2 has a longitudinal bore 9 therein, plugged at one end 10 and communicating with the nozzles 3–6 via radial passages 11 in the projections 8. The bore 9 is open at its opposite end 12, and there is an annular recess 13 in the sprinkler head 2 surrounding the open end 12 into which the ferrule 15 of a hose connector body 16 is adapted to be press fitted. Both the sprinkler head 2 and hose connector 16, like the nozzles 3–6, are desirably made of plastic, and the outer surface 17 of the ferrule 15 is tapered, preferably at a 15 degree angle, to establish a fluid-tight seal with the complemental tapered surface 18 of the outer wall 19 of the recess 13. The other end 20 of the hose connector body 16 opposite the ferrule 15 is internally threaded for connection to a suitable garden hose H.

Within such other end 20 of the connector 16 there is disposed a sleeve 21 provided with a flange 22 at one end which is pressed against a shoulder 24 therein. The other end 25 of the sleeve 21 extends through the connector ferrule 15 into the longitudinal bore 9 of the sprinkler head 2 beyond the radial passages 11. A longitudinal bore 26 in the sleeve 21 is communicated with the radial passages 11 in the sprinkler head 2 when brought into alignment with a slot 27 in the sleeve 21. Thus a simple rotation of the sprinkler head 2 with respect to the hose connector 16 and sleeve 21 will be effective to bring any one of the radial passages 11 into communication with the longitudinal bore 26 depending on which of the spray nozzles 3–6 is to be put in use. The sleeve 21 is preferably of thin-walled plastic material so that the water pressure contained therein will bulge the sleeve into fluid tight engagement with the wall of the bore 9.

For locking the sleeve 21 against rotation within the hose connector body 16, the sleeve 21 may be provided with a plurality of keys 30 adjacent the inner surface of the flange 22 for receipt in slots 31 in the connector shoulder 24. Moreover, suitable means such as the integral spike 33 shown may be provided for supporting the lawn sprinkler 1 in any desired position in the ground. It should be understood that if such a spike 33 is used, the slot 27 in the sleeve 21 should be disposed to face in the opposite direction whereby the water emitted therefrom will be directed away from the ground.

In use, the internally threaded end 20 of the hose connector body 16 is threaded onto a garden hose H or the like and the lawn sprinkler 1 is staked in the ground in a suitable location, after which the sprinkler head 2 is rotated to establish fluid communication between the hose H and the desired nozzle 3–6 through the sleeve bore 26, slot 27, and the respective radial passage 11, and the water is turned on. A gasket 37 may be disposed between the hose nipple 38 and sleeve flange 22 to insure against water leakage from the hose connector 16 along the threads 39.

As previously indicated, each of the nozzles 3–6 is adapted to establish a different spray pattern and accordingly the particular lawn configuration to be sprayed will dictate which spray nozzle to use. One of the nozzles 3 may be provided with a pair of circumferentially spaced arcuate slots 40 in the top plate 41 thereof, with an inwardly projecting conical surface 42 from the central portion of the top plate 41 inwardly of the arcuate slots 40 which is adapted to break up the stream of water into a fine spray as it passes through the associated radial passage 11 and is deflected radially outwardly through the arcuate slots 40 in opposite directions for watering a rectangular lawn area.

For watering semi-circular areas, the top plate 45 of the nozzle 4 has a semi-circular peripheral slot 46 therein with the underside of the top plate 45 being tapered at 47 adjacent the inner edge 48 of the slot 46 to direct the water in spray form out through the slot 46. The nozzle 5 is similar to the nozzle 4, but is provided with a peripheral slot 50 in the top plate 51 which is of a greater extent than a semi-circle. Otherwise, the construction is the same.

Finally, the nozzle 6 has a conical recess 55 in the top plate 56 with a central opening 57 through the bottom of the recess 55 communicating with the interior 58 of the nozzle cap. Within such cap interior there is a chamber 59 and a baffle plate 60 disposed radially inwardly of the chamber 59. The outer periphery of the baffle plate 60 has a series of helical slots 61 formed therein which impart a swirling motion to the water as it passes through the slots into the chamber 59 whereby as the water leaves the chamber 59 through the central opening 57, it is broken up into a very fine mist and spread out into a conical spray for covering a circular area of lawn.

From the above discussion, it can now be seen that the lawn sprinkler of the present invention is very simple in construction, easy to manufacture and assemble, and yet is capable of providing a wide variety of different water spray patterns, depending on which of the nozzles is brought into fluid communication with the water inlet through rotation of the sprinkler head. The sprinkler is constructed in such a manner that there is only one rotating part, the sprinkler head, and all of such parts are made to be press fitted one on the other while providing a fluid-tight seal to preclude leakage between the joints.

Other modes of applying the principles of the invention may be employed, change being made as regards the details described provided the features stated in any of the following claims or the equivalent of such be employed.

I therefore particularly point out and distinctly claim as my invention:

1. A sprinkler comprising a body having an inlet adapted for connection with a water supply conduit and an outlet, a sprinkler head having an annular recess in one end, said body including a ferrule means projecting from one end into said annular recess, the outer surface of said ferrule means having an outwardly flaring taper and the adjacent wall of said recess having a complemental inwardly directed taper for establishing a fluid-tight seal and an axially fixed, rotatable connection between said body and sprinkler head, said sprinkler head covering said outlet and being provided with a plurality of circumferentially spaced passages therein which are adapted to be successively brought into alignment with said outlet during rotation of said sprinkler head with respect to said body, a plurality of circumferentially spaced spray nozzles in fluid communication with said passages, and a tubular sleeve keyed in said body and having one end extending into said sprinkler head, said tubular sleeve being closed at said one end except for a slot which defines said outlet for said body, said slot being adapted to be brought into alignment with said passages in said head by rotating said head relative to said body and sleeve for communicating said passages with said outlet via said tubular sleeve and slot.

2. The sprinkler of claim 1 wherein the wall of said sleeve is formed of a thin plastic material, whereby the water pressure contained therein will bulge said sleeve into fluid-tight engagement with said sprinkler head.

3. The sprinkler head of claim 1 wherein the other end of said tubular sleeve has a flange thereon which is pressed against a shoulder in said body, said keys being provided adjacent said flange for receipt in aligned slots in said shoulder to lock said sleeve against rotation relative to said body, whereby when said sprinkler head is rotated with respect to said body, said spray nozzles are brought into fluid communication with said slot in said sleeve one after another.

4. The sprinkler of claim 1 wherein one of said spray nozzles has an arcuate discharge slot therein with the inner edge of said slot being tapered for directing the water in an arcuate spray pattern from said slot; another of said spray nozzles has a pair of said arcuate slots therein circumferentially spaced from each other and facing opposite directions, and a radially inwardly projecting conical surface centrally of said slot which is adapted to break up the stream of water into a fine spray as it passes through the associated passage and is deflected outwardly through said slots in opposite directions to provide a rectangular spray pattern; and still another of said spray nozzles is provided with a conical recess with a central opening through the bottom of said recess, an inner chamber communicating with said central opening, and a baffle plate disposed upstream of said chamber, said baffle plate being provided with a series of helical slots in the outer periphery thereof which impart a swirling motion to the water as it passes through said slots into said chamber, whereby the water leaving said chamber through said central opening is broken up into a very fine mist and spread out into a conical spray for covering a circular area of lawn.

5. A sprinkler comprising a body having an inlet adapted for connection with a water supply conduit and an outlet, a sprinkler head having an annular recess in one end, means for rotatably mounting said sprinkler head on said body and in fluid tight engagement therewith, said sprinkler head covering said outlet and being provided with a plurality of circumferentially spaced passages therein which are adapted to be successively brought into alignment with said outlet during rotation of sprinkler head with respect to said body, a plurality of circumferentially spaced spray nozzles in fluid communication with said passages, and a tubular sleeve keyed in said body and having one end existing into said annular recess in said sprinkler head, said tubular sleeve being closed at said one end except for a slot which defines said outlet for said body, said slot being adapted to be brought into alignment with said passages in said head by rotating said head relative to said body and sleeve for communicating said passages with said outlet via said tubular sleeve and slot.

References Cited

UNITED STATES PATENTS

| | | | |
|---|---|---|---|
| 673,362 | 4/1901 | Hill. | |
| 1,463,666 | 7/1923 | Buckner | 239—497 |
| 1,472,669 | 10/1923 | Overbaugh. | |
| 1,554,521 | 9/1925 | Reece | 239—394 |
| 2,746,792 | 5/1956 | Hough | 239—567 |
| 3,067,950 | 12/1962 | Goldman | 239—497 |
| 3,085,754 | 4/1963 | Thompson. | |
| 3,094,283 | 6/1963 | Bolister | 239—394 |
| 3,214,102 | 10/1965 | Meyer | 239—602 |
| 2,281,973 | 5/1942 | Healy | 285—280 |

FOREIGN PATENTS 789,313  8/1935  France.

EVERETT W. KIRBY, *Primary Examiner.*